Sept. 6, 1932. H. M. CRAWFORD ET AL 1,876,325
POULTRY BROODER
Filed Oct. 15, 1929   5 Sheets-Sheet 5
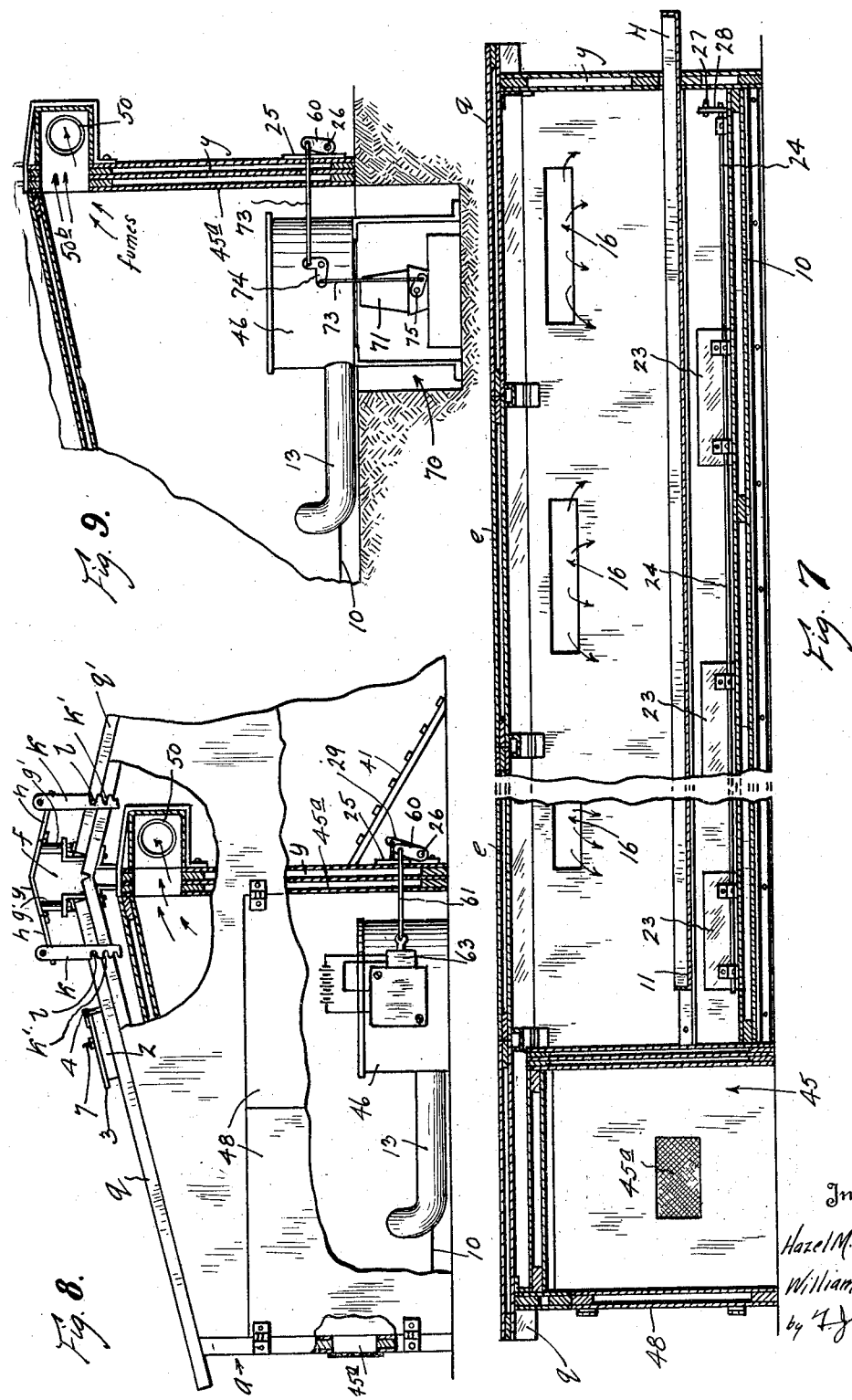

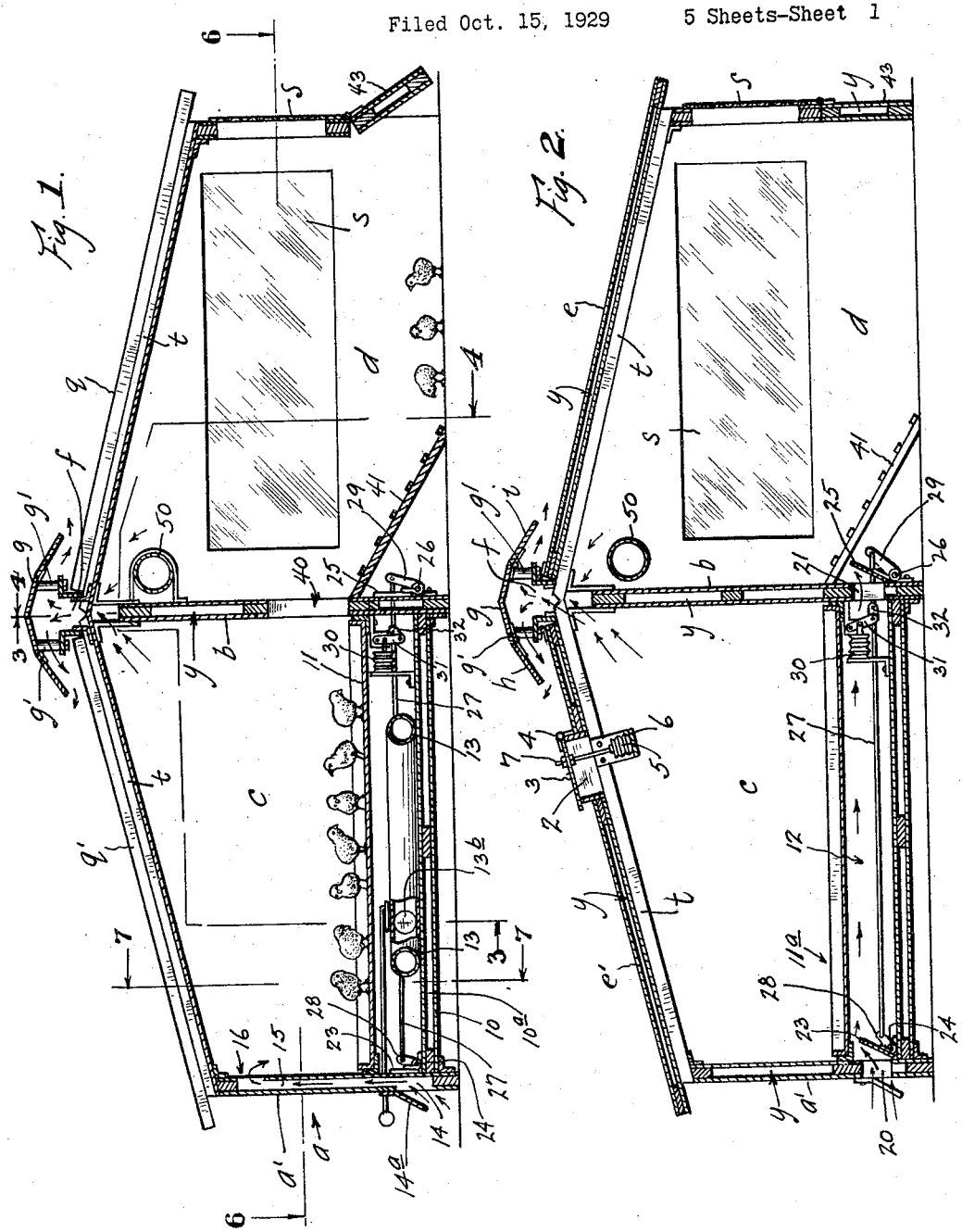

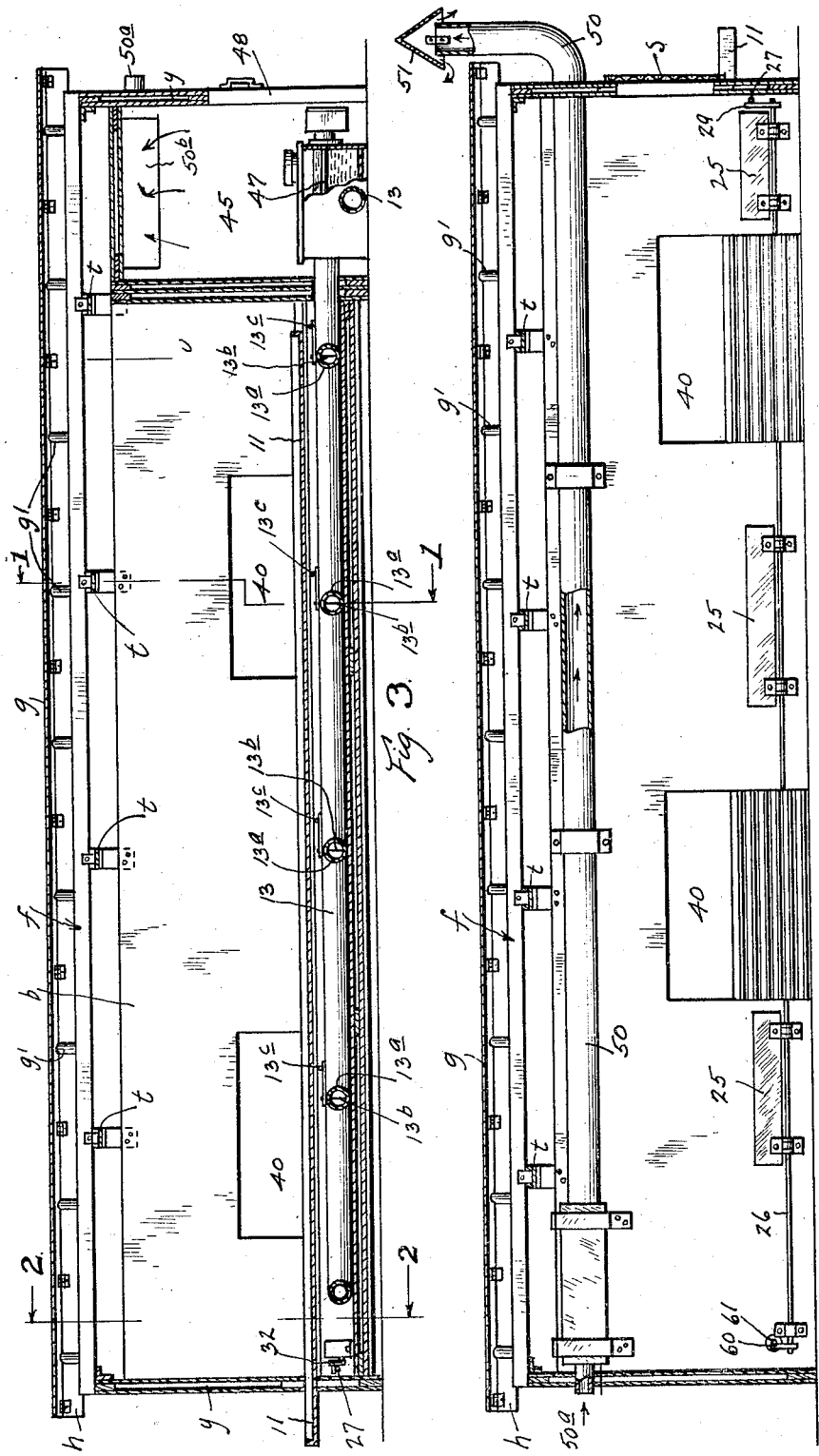

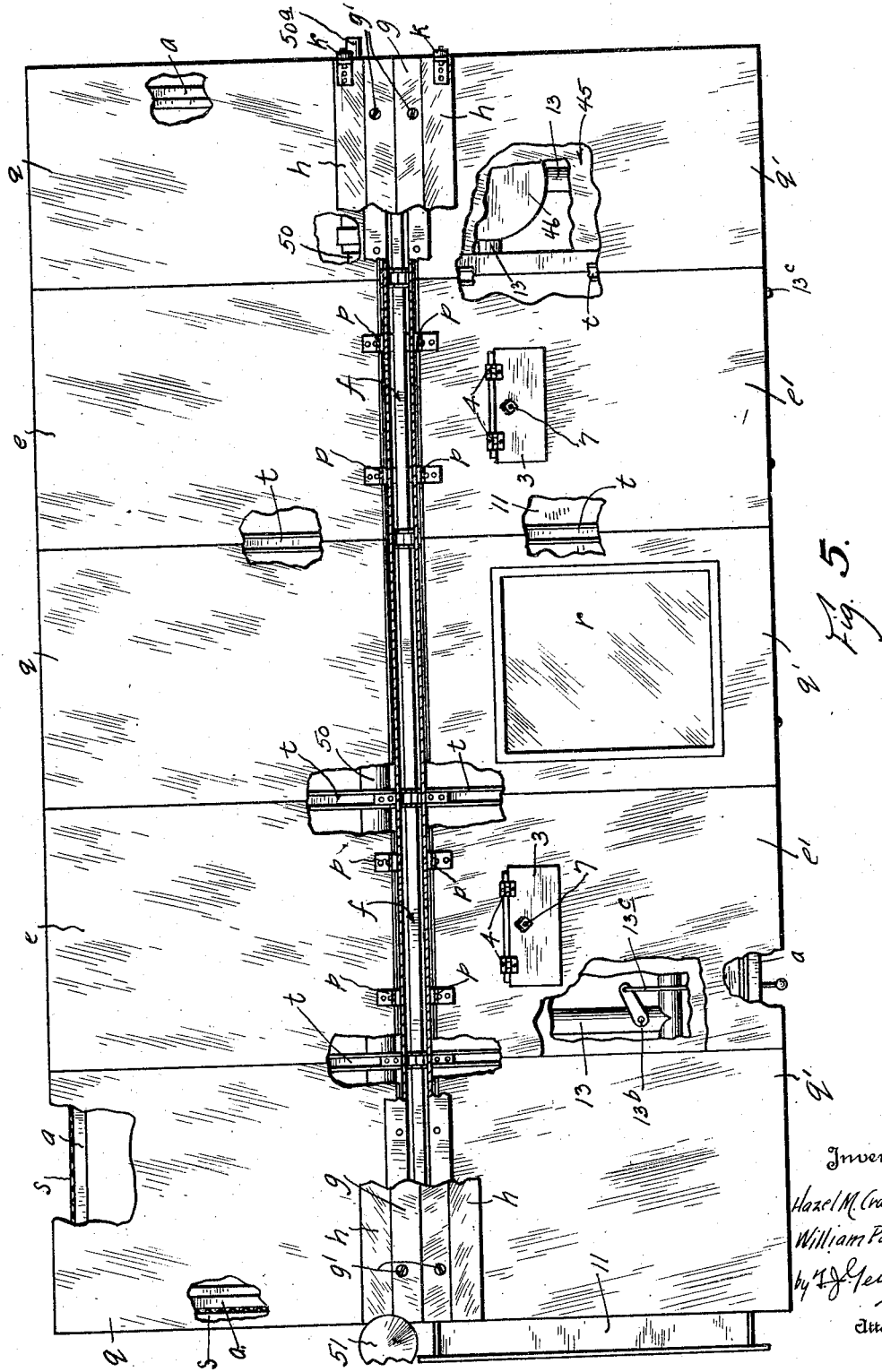

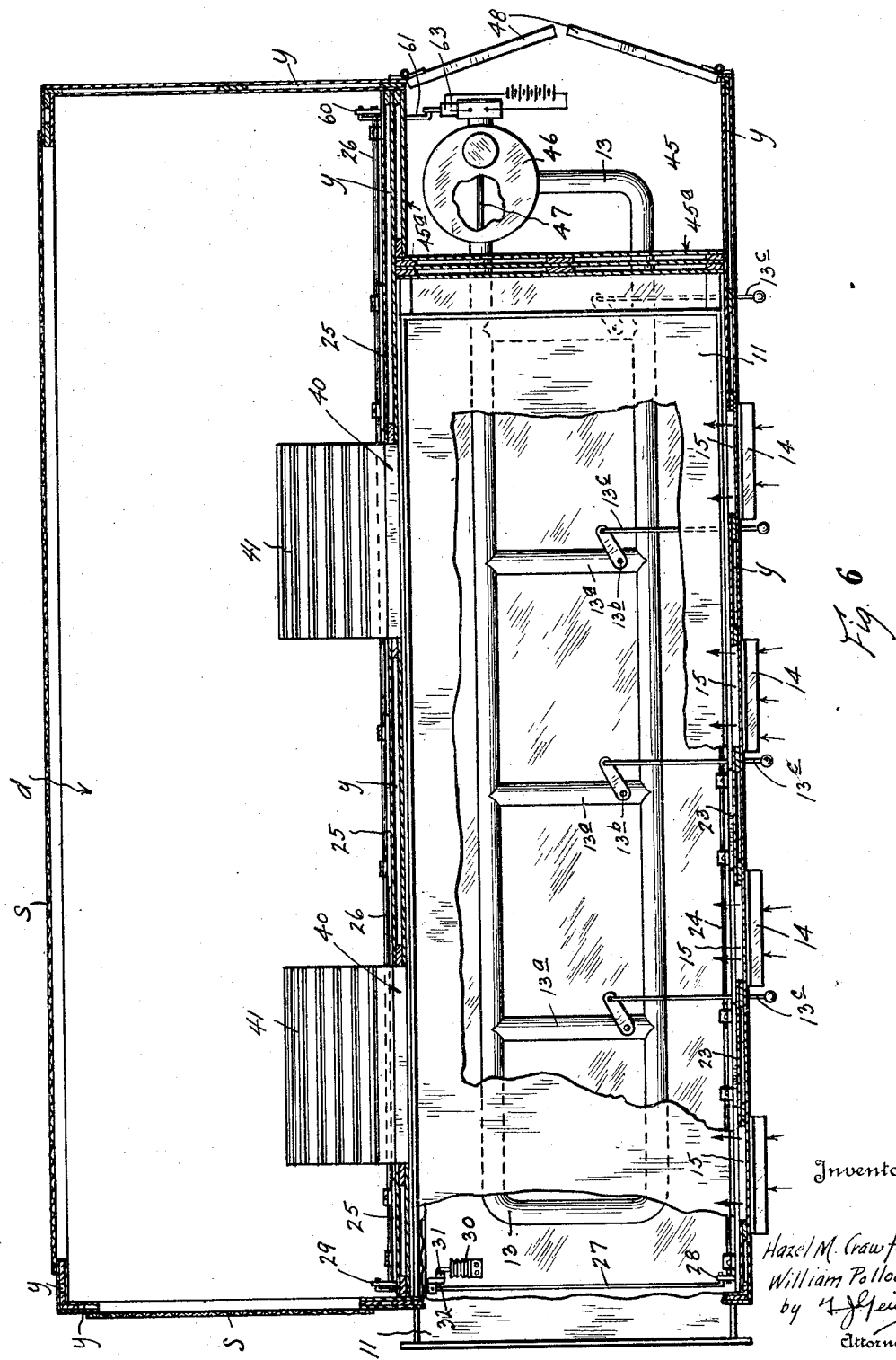

Patented Sept. 6, 1932

1,876,325

UNITED STATES PATENT OFFICE

HAZEL M. CRAWFORD AND WILLIAM POLLOCK, OF PORTLAND, OREGON; SAID POLLOCK ASSIGNOR TO PORTLAND FEED MILLS COMPANY, OF PORTLAND, OREGON, A CORPORATION OF OREGON

POULTRY BROODER

Application filed October 15, 1929. Serial No. 399,788.

Our invention relates to poultry brooders and the like.

In the raising of young chicks, which are hatched in incubators, it is the well known practice to house them in the so-called "brooder" adapted to simulate as far as possible the conditions under which the mother hen would have raised them had they been naturally born.

The young chicks are very sensitive to cold and wet, the effects of which reduce their vitality and cause them to be subject to various diseases from which they seldom fully recover, and which are directly traceable from improper housing or brooding conditions.

In the types of brooders in the present use, which are heated from above, the colder stratum of air tends to lie on the floor, so that the chicks' legs and feet are cold, while their heads and bodies are in the upper warmer stratum. This condition tends to cause the so-called leg weakness, resulting from cold feet.

Further, in the types of brooders in which the heat is supplied from underneath, the floor is generally in direct contact with the source of heat, which in the case of accidental over heating is liable to burn the chicks. Also, over heating of the brooder chamber is a frequent cause of brooder pneumonia and the like, since the chicks become over heated in the brooder and then run out to the relatively colder outer air, where they cool off too rapidly.

Therefore the object of our invention is to provide an improved and efficient brooder, adapted to simulate the conditions under which chicks brought up by the mother hen are raised.

A further object of our invention is to provide a well ventilated brooder adapted to be indirectly heated from underneath and so constructed that there will be no fire hazard from the heater chamber, and to provide in combination, economical and practical heat transmitting means and a thermostatic control, whereby the brooder chamber will be evenly and efficiently heated and ventilated, and in which the chicks will be so comfortably housed that they will not crowd together for warmth and will remain healthy and unaffected by the diseases which are common among them.

A still further object of our invention is to provide our brooder with a so-called scratching shed, which we propose to heat at a temperature slightly above that of the outer atmosphere by means of the waste heat from the brooder, whereby the chicks will not pass directly from the relatively cold outer atmosphere to the warm interior of the brooder chamber.

We attain these objects in a poultry brooder comprising a housing, a longitudinal partition in said housing dividing the latter into a brooder chamber and a scratching shed, openings in the partition connecting the one with the other, a ventilating opening in the apex of the said roof communicating with each side of said partition, a vent in the portion of the roof over said brooder chamber, a cover over said vent, means for operating said cover and a vent in the lower exterior wall of said chamber, a passageway in said wall connecting the said vent with said chamber at the top, whereby air will enter through the said passageway and fall to the floor until heated and then pass upward through the ventilation opening in the roof, thus insuring efficient ventilation of the brooder chamber.

A floor is provided in the brooder chamber and a removable false floor located above said floor forming a coil chamber in which hot water coils are arranged, vents in the wall at each side of said coil chamber, covers controlling said vents, means operating said covers, the vents at one side of said coil chamber opening into said scratching shed, whereby the escaping heat from the coil chamber will warm said scratching shed.

A heater chamber is provided at one end of said coil chamber, in which a heating element is located for heating the said hot water coils and operative means are provided connecting the door operating means of said coil chamber with said heating element, whereby when said doors are opened said heating element will be cut off.

These objects and other incidental features of our invention, as well as the details of construction and mode of operation are hereinafter fully described with reference to the accompanying drawings.

In the drawings:

Fig. 1 shows a section taken on the line 1—1 of Fig. 3 and illustrates the relative arrangement of the brooder chamber and scratching shed;

Fig. 2 shows a section taken on the line 2—2 of Fig. 3 and illustrates further details of construction;

Fig. 3 shows a section taken on the line 3—3 of Fig. 1 and illustrates the arrangement and construction of the heater chamber;

Fig. 4 shows a section taken on the line 4—4 of Fig. 1 and illustrates further details of construction;

Fig. 5 shows a top plan view of our brooder partly in section and illustrates further details of construction;

Fig. 6 shows a plan section of our brooder taken on the line 6—6 of Fig. 1 with parts broken away to illustrate the relative arrangement of the hot water coils, heater element and the control means therefor;

Fig. 7 shows a section taken on the line 7—7 of Fig. 1 and illustrates the relative arrangement of the vents controlling the coil chamber;

Fig. 8 shows a fragmentary end view of our brooder partly in section and illustrates the electric heater element and automatic control;

Fig. 9 shows a fragmentary view similar to Fig. 8 and illustrates the automatic heat control when an oil heater is used.

Referring now to the figures: Our brooder comprises a housing $a$ provided with a central longitudinal partition $b$, dividing the same into the brooder chamber $c$ and scratching shed $d$.

The housing $a$ is provided with a peaked roof sloping equally in each direction and comprising sections $e$, $e'$ on each side, hinged at their upper edges to the housing frame as at $p$ and stationary sections $q$, $q'$. The peaked roof construction is provided to facilitate air circulation within the brooder and the hinged roof sections for convenient access to the interior for cleaning, inspection and the like. The roof sections $e$, $e'$ and $q$, $q'$ are spaced at their upper edges to provide a ventilation opening $f$, which communicates with both the brooder chamber $c$ or scratching shed $d$, and the cross frame members $t$, which support the roof sections and on which their lateral edges rest, are of channel construction, so that rain leaking between the sections will be caught in the channel and prevented from entering the brooder chamber.

The walls and roof of the housing $a$ are spaced double construction, forming a dead air space as $y$ in their centers for insulation, and windows $r$, $s$ are provided in the roof and exterior walls, covered by suitable transparent material commonly used in such construction.

The opening $f$ is protected by an inverted V-shaped cover $g$ supported over the said opening on post $g'$. Hinged sections $h$, $i$ are secured to the longitudinal edges of the V-shaped cover $g$, which are adjustably supported by arms $k$, Fig. 8, provided with notches $k'$ engageable in pins $l$ on the roof frame. In this way the opening $f$ may be entirely or partially closed on one side or the other, depending on the atmospheric temperature and direction of the wind.

Vents 2 are provided in the roof sections $e'$ and covers 3 are hinged to one side thereof as at 4. The covers 3 are opened and closed by thermostatic instruments 5, suitably mounted on the underside of the roof on metal straps 6 and connected to the covers by pins 7. Thus changes in temperature within the chamber will cause the dampers to automatically open and close within predetermined limits set beforehand by adjustment of the thermostatic element.

Vents 14 provided with eaves 14a, are provided in the exterior wall $a'$ of the housing, which communicate through a passageway 15 with the interior of the brooder chamber, through openings 16 just below the roof.

The brooder chamber $c$ is provided with a floor 10, double constructed so as to form a dead air space 10a in the center, for heat insulation. A false floor 11, consisting of a slidable tray, which may be withdrawn through an opening 11a in one end of the brooder chamber for convenience in the cleaning of the same, is supported above the floor 10 and forms therewith a chamber 12 in which hot water coils 13, hereinafter more fully described, are located.

The coil chamber 12 is provided with vents 20 in the said wall $a'$ at one side and with vents 21 in the partition $b$, of the other side, the latter communicating with the scratching shed $d$.

Inwardly opening covers 23 are secured to the side of the vents 20 fast on rods 24 and similar covers 25 are secured to the edge of the vents 21 fast on rods 26 and are adapted to open outwardly in the scratching shed. A rod 27 extending transversely through the coil chamber is connected at one end to an arm 28 fast on the rod 24 and located on the inside of the coil chamber 12, and at the other end to an arm 29 fast on the rod 26, on the outside of the said coil chamber 12 and within the scratching shed. A thermostatic instrument 30 is operatively connected by links 31 to another arm 32 on the rod 26.

By this construction when the temperature in the coil chamber 12 reaches a predetermined degree, the covers 23, 25 will be actuated to open to admit a current of relatively colder atmospheric air through the vent 20 which passes over and cools the hot water coils 12 and then through the vent 21 into the scratching shed d, where having absorbed some of the heat from the coils 12, the air warms the scratching shed.

A passageway 40 is provided in the brooder chamber b, communicating with the scratching shed, and runways 41 are provided for the convenience of the chicks in passing from the ground, forming the floor of the shed to the higher level of the brooder floor 11. The scratching shed is provided with an opening in the bottom wall, running the entire length thereof for convenience in cleaning the said shed, and a door 43 is hinged at the top of the opening for closing the same.

A heater chamber 45 insulated from the brooder chamber b by triple wall construction as at 45a, is provided at one end of the housing a on the side of the brooder chamber, in which is located a suitable hot water reservoir 46, heated by an electric heating element 47, as shown in Fig. 8 or an oil heater 71, hereinafter described, as shown in Fig. 9.

A conduit pipe 50 is longitudinally located in the scratching shed under the peak of the roof, which communicates with the heater chamber at one end through a vent 50b and with the atmosphere at the other, whereby the warm air of the said heater chamber may escape and at the same time slightly warm the scratching shed. A hood 51 is provided on the exterior end of the conduit pipe 50 and a relatively smaller pipe section 50a is provided in the end of the pipe 50 in the heater chamber, which communicates with the atmosphere to permit cold air to be readily drawn into the pipe at this end to accelerate the draft through it.

The heater chamber is conveniently accessible to the outside through doors 48 and an opening 45a, suitably protected, is provided to facilitate the admission of fresh air and the circulation of warm air through the conduit 50.

The hot water coils 13 consist of a suitable water pipe connected at each end with the reservoir 46 and running the length of the coil chamber 12 which are provided with transverse connections 13a in which are provided valves 13b, controlled by manually operable bars 13c, whereby the circulation of the hot water may be restricted to a desired part of the coil chamber 12.

In operation, when our brooder has been heated to the required temperature, air entering from the outside, through the vents 14, passes through the passageways 15 and enters the top of the brooder chamber, but being colder than the air within, drops to the bottom of the brooder chamber where it is indirectly heated by the floor 11 and then rises and escapes through the openings f in the roof, thus providing efficient circulation and functioning to completely change the air within the brooder chamber approximately every forty-five minutes.

Further, if the temperature in the brooder chamber rises above the predetermined temperature, the thermostatic instruments 5 will open the vents 2 in the roof allowing the warm air to escape, and simultaneously the thermostatic instruments 30 set to operate at the same degree of temperature in the coil chamber will open the covers 23 and 25 on the vents 20, 21, respectively and allow the relatively cold air to enter and cool the floor 11 and coils 13. When the temperature falls the operation will be in reverse order.

When electric power is used for heating the hot water coils 13, we provide an arm 60 on the end of the rod 26 adjacent the heater chamber, connected by a link 61 with a switch 63 in the circuit of the heater element 47, so that the opening of the covers 23, 25 will operate the switch to shut off the heating element.

As shown in Fig. 9, when electric power is not used or is not available and an oil heater or other means are used, a mechanical connection may be substituted for the automatic control of the heater. In Fig. 9, assuming an oil heater is to be used, a pit 70 is dug in the ground beneath the heater chamber in which an oil heater 71 will be located so as to be underneath the water reservoir 46 and the arm 60 will be connected through rods 73 and a bell crank lever 74, to the valve or wick control of the heater, so that the operation of the doors 23, 25 will correspondingly reduce or increase the heat generated and hence create a saving in fuel.

By this construction we have provided a brooder adapted for being indirectly heated through the floor 11, which will keep the chicks warm and comfortable, so that they will not crowd together, and provided with thermostatically controlled heating means which will prevent both the under and over heating of the brooder. Further by providing automatic control of the heating means and double construction of the housing walls, we have provided a brooder which may be very economically heated.

We claim:

1. A poultry brooder and the like comprising, a brooder chamber, a vent in the roof of said chamber, a thermostatically controlled cover controlling said vent, a vent in the lower wall portion of said chamber, a passageway in said wall connecting the said vent with said chamber at the top, a ventilating opening in the roof of the chamber, a false floor in said brooder chamber forming a coil chamber between said false floor and the real floor of said brooder chamber, hot water coils located in said coil chamber, vents in the wall at each side of said coil chamber, thermostatically controlled covers controlling said vents and a heater chamber at one end of said brooder chamber, a heating element in said heating chamber, by which said hot water coils are heated.

2. A poultry brooder and the like comprising, a brooder chamber, a vent in the roof of said chamber, a thermostatically controlled cover controlling said vent, a vent in the lower wall portion of said chamber, a passageway in said wall connecting the said vent with said chamber at the top, a ventilating opening in the roof of the chamber, manually adjustable means for closing said ventilating opening, a false floor in said brooder chamber forming a coil chamber between said false floor and the real floor of said brooder chamber, hot water coils located in said coil chamber, vents in the wall at each side of said coil chamber, thermostatically controlled covers controlling said vents, a heater chamber at one end of said brooder chamber, a heating element in said heating chamber by which said hot water coils are heated and operative means connecting the door operating means of said coil chamber, with said heating element, whereby when said doors are opened said heating element will be cut off.

3. A poultry brooder and the like comprising, a brooder chamber, a vent in the roof of said chamber, a thermostatically controlled cover controlling said vent, a vent in the lower wall portion of said chamber, a passageway in said wall connecting the said vent with said chamber at the top, a ventilating opening in the roof of the chamber, manually adjustable means for closing said ventilating opening, a removable false floor in said brooder chamber forming a coil chamber between said false floor and the real floor of said brooder chamber, hot water coils located in said coil chamber, vents in the wall at each side of said coil chamber and thermostatically controlled covers controlling said vents, a heater chamber at one end of said brooder chamber, an electric heating element in said heating chamber by which said hot water coils are heated and operative means connecting the door operating means of said coil chamber with said electric heating element, whereby when said doors are opened said heating element will be cut off.

4. A poultry brooder and the like comprising, a brooder chamber, a vent in the roof of said chamber, a thermostatically controlled cover controlling said vent, a vent in the lower wall portion of said chamber, a passageway in said wall connecting the said vent with said chamber at the top, a ventilating opening in the roof of the chamber, manually adjustable means for closing said ventilating opening, a removable false floor in said brooder chamber forming a coil chamber between said false floor and the real floor of said brooder chamber, hot water coils located in said coil chamber, vents in the wall at each side of said coil chamber, thermostatically controlled covers controlling said vents, a heater chamber at one end of said brooder chamber, a heating element in said heating chamber, by which said hot water coils are heated, operative means connecting the door operating means of said coil chamber, with said heating element, whereby when said doors are opened said heating element will be cut off and manually operable valves in said hot water coils for controlling the distribution of heat in the coil chamber.

5. A poultry brooder and the like comprising, a brooder chamber, a vent in the roof of said chamber, a thermostatically controlled cover controlling said vent, a vent in the lower wall portion of said chamber, a passageway in said wall connecting the said vent with said chamber at the top, a ventilating opening in the roof of the chamber, a false floor in said brooder chamber forming a coil chamber between said false floor and the real floor of said brooder chamber, hot water coils located in said coil chamber, vents in the wall at each side of said coil chamber, thermostatically controlled covers controlling said vents, a heater chamber at one end of said brooder chamber, a heating element in said heating chamber by which said hot water coils are heated, operative means connecting the door operating means of said coil chamber, with said heating element, whereby when said doors are opened said heating element will be cut off, and valves in said hot water coils for controlling the distribution of heat in the coil chamber.

6. A poultry brooder and the like comprising, a brooder chamber, a vent in the roof of said chamber, a thermostatically controlled cover controlling said vent, a vent in the lower wall portion of said chamber, a passageway in said wall connecting the said vent with said chamber at the top, a false floor in said brooder chamber forming a coil chamber between said false floor and the real floor of said brooder chamber, hot water coils located in said coil chamber, vents in the wall at each side of said coil chamber, thermostatically controlled covers controlling said vents and a heater chamber at one end of said brooder chamber, a heating element in said heating chamber, by which said hot water coils are heated.

7. A poultry brooder and the like comprising, a brooder chamber, a vent in the roof of said chamber, a thermostatically controlled cover controlling said vent, a vent in the lower wall portion of said chamber, a passageway in said wall connecting the said vent with said chamber at the top, a false floor in said brooder chamber forming a coil chamber between said false floor and the real floor of said brooder chamber, hot water coils located in said coil chamber, vents in the wall at each side of said coil chamber, thermostatically controlled covers controlling said vents, a heater chamber at one end of said brooder chamber, a heating element in said heating chamber, by which said hot water coils are heated and operative means connecting the door operating means of said coil chamber, with said heating element, whereby when said doors are opened said heating element will be cut off.

8. A poultry brooder and the like comprising, a brooder chamber, a vent in the roof of said chamber, a thermostatically controlled cover controlling said vent, a vent in the lower wall portion of said chamber, a passageway in said wall connecting the said vent with said chamber at the top, a ventilating opening in the roof of the chamber, manually adjustable means for closing said ventilating opening, a false floor in said brooder chamber forming a coil chamber between said false floor and the real floor of said brooder chamber, hot water coils located in said coil chamber and vents in the wall at each side of said coil chamber, thermostatically controlled covers controlling said vents.

9. In a poultry brooder and the like, the combination of, a housing having an inverted V-shaped roof, a partition in said housing dividing the latter into a brooder chamber and a scratching shed, openings in the partition connecting the one with the other, a ventilating opening in said roof communicating with each side of said partition, a vent in the portion of the roof over said brooder chamber, a cover over said vent, means for operating said cover, a vent in the lower exterior wall of said chamber, a passageway in said wall connecting the said vent with said chamber at the top, a floor in said brooder chamber and a false floor located above said floor forming a coil chamber, hot water coils provided in said coil chamber, vents in the wall at each side of said coil chamber, covers controlling said vents, means operating said covers, the vents at one side of said coil chamber opening into said scratching shed, whereby the escaping heat from the coil chamber will warm said scratching shed.

10. In a poultry brooder and the like, the combination of a housing having an inverted V-shaped roof, a partition in said housing dividing the latter into a brooder chamber and a scratching shed, openings in the partition connecting the one with the other, a ventilating opening in said roof communicating with each side of said partition, a vent in the portion of the roof over said brooder chamber, a cover over said vent, thermostatic means for operating said cover, a vent in the lower exterior wall of said chamber, a passageway in said wall connecting the said vent with said chamber at the top, a floor in said brooder chamber and a removable false floor located above said floor forming a coil chamber, hot water coils arranged in said coil chamber, vents in the wall at each side of said coil chamber, covers controlling said vents, thermostatic means operating said covers, the vents at one side of said coil chamber opening into said scratching shed, whereby the escaping heat from the coil chamber will warm said scratching shed, a heater chamber at one end of said coil chamber, a heating element in said heating chamber by which said hot water coils are heated and operative means connecting the door operating means of said coil chamber, with said heating element, whereby when said doors are opened said heating element will be cut off.

11. In a poultry brooder and the like, the combination of, a housing having an inverted V-shaped roof and heat insulated walls, a longitudinal partition in said housing dividing the latter into a brooder chamber and a scratching shed, openings in the partition connecting the one with the other, a ventilating opening in the apex of the said roof communicating with each side of said partition, a vent in the portion of the roof over said brooder chamber, a cover over said vent, thermostatic means for operating said cover, a vent in the lower exterior wall of said chamber, a passageway in said wall connecting the said vent with said chamber at the top, a floor in said brooder chamber and a false floor located above said floor forming a coil chamber, hot water coils arranged in said coil chamber, vents in the wall at each side of said coil chamber, covers controlling said vents, thermostatic means operating said covers, the vents at one side of said coil chamber opening into said scratching shed, whereby the escaping heat from the coil chamber will warm said scratching shed, manually operable valves in said hot water coils for controlling the distribution of heat in the coil chamber and a conduit pipe leading from said heater chamber through said scratching shed, whereby the waste heat from said heater chamber will also warm said scratching shed.

12. A poultry brooder comprising a brooder chamber, a vent in the roof of said chamber, a cover controlling said vent, thermostatic means located in said brooder chamber for controlling said vent cover, a vent in the lower wall portion of said chamber, a passageway in said wall connecting said vent with said chamber at the top, a coil chamber provided in the floor of said brooder chamber, hot water coils located in said coil chamber, vents in said coil chamber, covers controlling said vents, thermostatic means located in said coil chamber for controlling said vent covers and said thermostatic means adapted to be actuated simultaneously by the temperatures in said brooder chamber and coil chamber to operate said vent covers.

HAZEL M. CRAWFORD.
WILLIAM POLLOCK.